1358X
Sheet 1-3 Sheets.
B. R. Reid,
Making Cut Nails,
Patented Aug. 18, 1810.
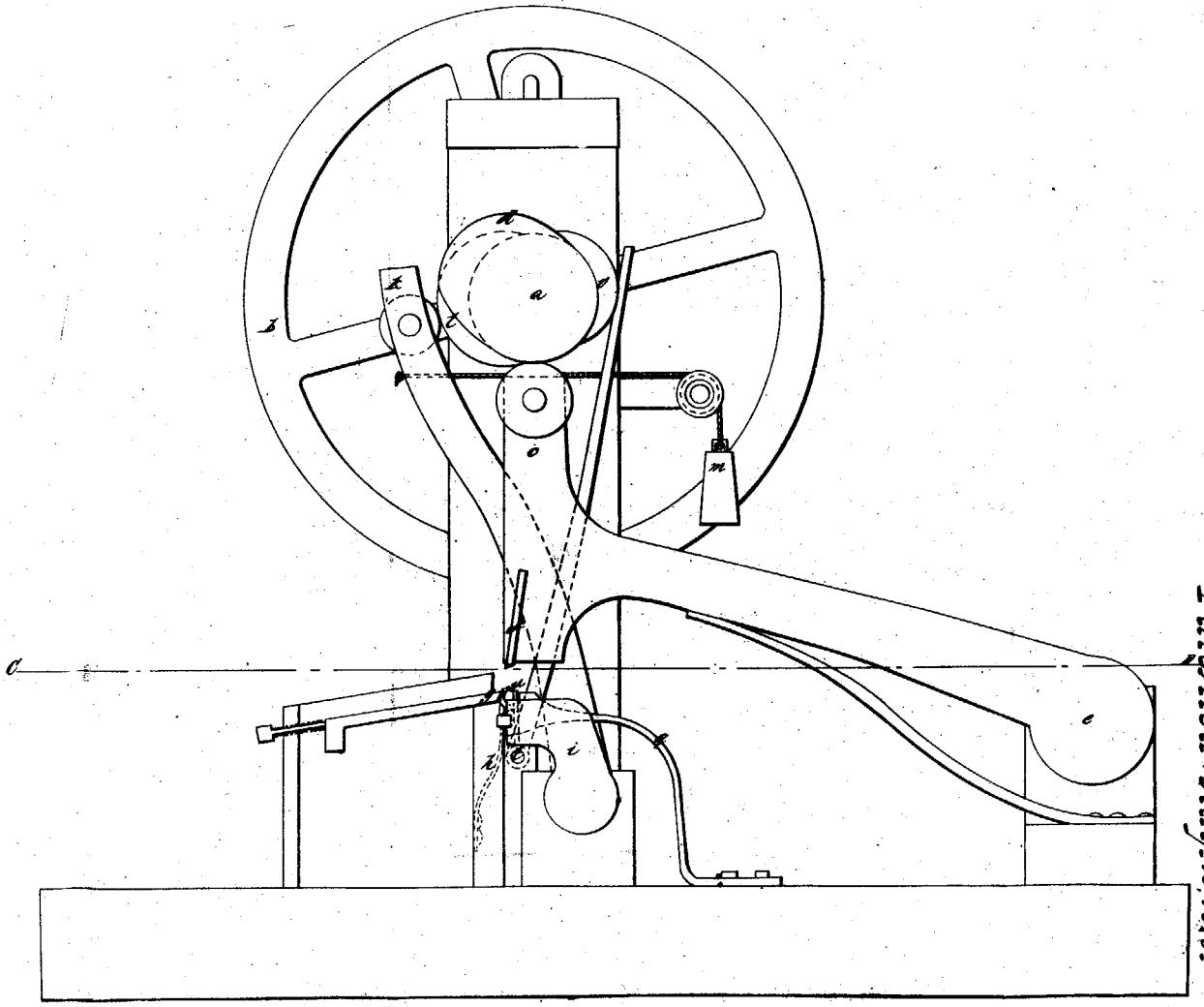

1358X
Sheet 2. 3 Sheets.
B. R. Reid,
Making Cut Nails,
Patented Aug. 18, 1810.
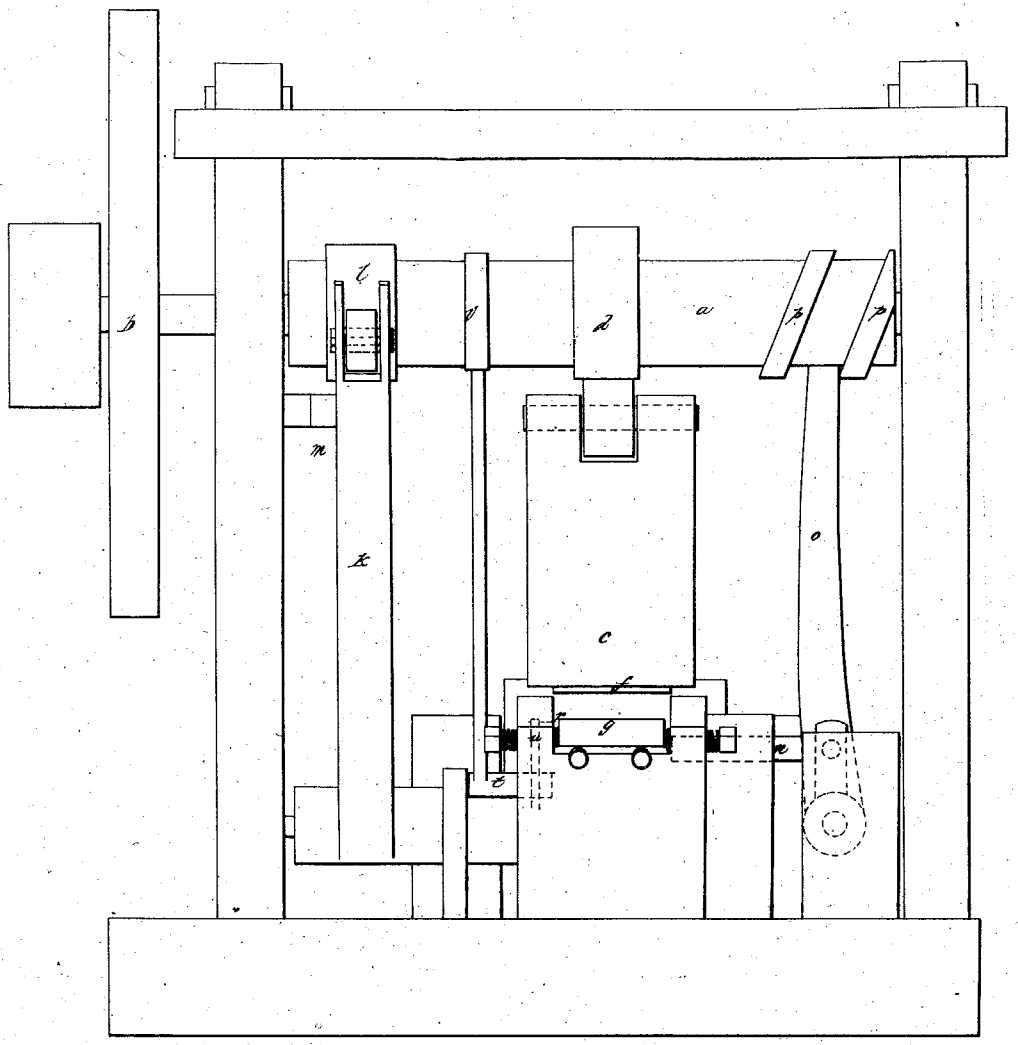

1358X
Sheet 3-3 Sheet
B. R. Reid,
Making Cut Nails,
Patented Aug. 18, 1810.
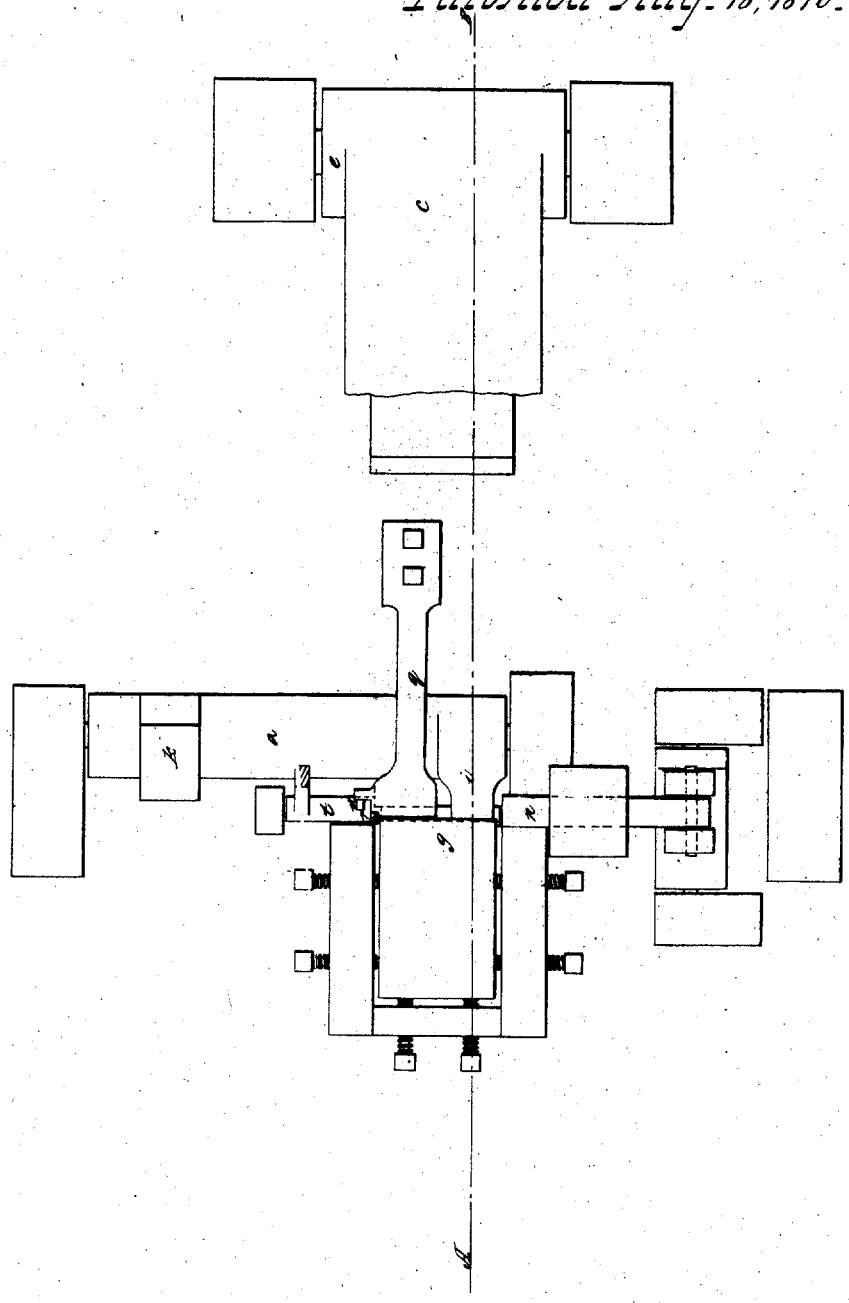

Briggs Rogers Reid
Letters Patent

1358X

The Schedule referred to in these Letters Patent and making part of the same containing a description in the words of the said Briggs Rogers Reid himself of his Machine for cutting and heading nails at one operation.... —
This Machine is made of Iron and steel and consists of a bed piece to which the several parts of the machine are fixed on this bed piece are fixed four pillars (or two as may be found most convenient) which support the main axis that communicates motion to the whole machine. This axis which is furnished with an Iron balance wheel is placed over or nearly over the cutting and heading apparatus and is carried by a band. The cutting apparatus consists of the following parts viz. ...
1 a moving jaw (with a friction wheel in the upper part of it) placed under the axis in such a manner as to be moved by a cam on the axis as it revolves, this jaw moves on an axis or centres at its lower end. 2. Two Cutters called the upper cutter and lower cutter. The upper cutter which is fixed on the fore part of the moving jaw, stands nearly vertical; and the under cutter is placed nearly horizontal so that when the two edges of the cutters meet their planes form an obtuse angle.
The Heading apparatus which lies under the cutters consists of the following parts viz. 1 a fixed die placed under and near one side of the under cutter. this die has a notch in it which comes directly under the edge of the cutter and corresponds to a notch in the moving die hereafter described) so as to enclose the neck of the nail while heading 2. a moving die having a notch in it as above mentioned, is placed in a jaw fixed on end of an axis and is moved forward to meet the
fixed die by means of an upright arm on the other end of
this axis and the end of this upright arm is furnished with
a friction wheel which meets a cam on the main axis
that communicates motion to it the upright arm is car-
ried back by a weight. 3. The die. which forms the
head of the nail by pressure. The die is fixed by a pivot
to an upright arm which slides it backwards and
forwards horizontally through a groove so as to press and
head the nails as they successively pass into the dies.
This upright arm is fixed on an axis at its lower end
and at the upper end has a horizontal friction wheel
which meets an oblique cam on the main axis that
carries it forward to head the nail and another oblique
cam which carries it back again or this backward
motion may be effected by means of a weight connec-
ted with the upright arm. The conveyance and clear-
ing apparatus viz. The apparatus which conveys the
nail from the cutters to the dies is fixed under the
moving jaw which carries the upper cutter it con-
sists of a piece of steel nearly in the shape of an [illegible].
That end of it which lies under the edge of the upper
cutter has a groove or rabbet of the shape and depth
of the nail intended to be cut. this groove receives the
end of the nail plate and holds it till it is cut
and carried down together with the knife to the
notches of the dies above described. and is there retained
by a spring-catch till the upper cutter rises above the
under one and the nail is griped between the two
dies. As soon as the nail is griped the steel piece
which contains the groove is disengaged from the
nail and is raised up to its place under the mov-
ing jaw by means of a spring or weight. The manner in which it is disengaged from the nail is by means of
a slender horizontal axis placed in the bed piece on
which axis is a short arm that takes into a notch in
the piece containing the groove. this axis is moved by a
slender upright arm which is moved by a cam on the
main axis and is returned to its place by a weight or
spring and in its return brings up the groove even
with the edge of the under cutter to receive another nail.
The piece containing the groove serves as a conveyance
for the nail and at the same time as a guage or a small
fixed guage may be placed behind the upper cut-
ter after a nail is cut and conveyed to the dies
and headed it is cleared from them by the movement
of the jaw and groove as they pass down together to
convey another nail to the dies. The manner of us-
ing the above described Nail Machine. The nail plate
is held by the workman on the face of the under cutter,
with the end placed into the groove or rabbet men-
tioned in the description and is turned over every
time a nail is cut. The cutting part of the above
Nail Machine when detached from the heading part
affords a very expeditious way of making the points or
shapes of nails without the heads. To effect this the
moving jaw is placed in a solid piece of iron on
which the under cutter is placed also and both
vibrate together horizontally on an upright pin
or under the centre of the cutters. The whole being
then placed under the main axis of the machine.
the upper cutter is moved by cams on the same axis
which plays on the head of the moving jaw. or on a
friction wheel placed in the head of the jaw. the
vibration of the cutters is effected thus- a perpendicular
axis stands on the bed piece behind the moving jaw
and and at the lower end of this axis is an arm connected
with the part of the machine which contains the under
cutter and at the upper end of the same axis is another
arm running parallel with the main axis and mo-
ved by that axis by means of a crank and sweep. The
vibration is regulated by moving that end of the sweep
which is connected with the upper arm of the perpendic-
ular axis a little nearer to or further from that axis Signed in presence
of [illegible] H. Putnam
Jno Pickering Jr Briggs R. Reid.

The principles of said nail machine may be further applied in
the following manner viz. The set (which forms the head of the nail
by pressure) moves on its lower end on an axis fixed in the bed piece —
In the set is fixed horizontally a steel bar the end of which strikes
against the nail in forming the head. this steel bar may be reg-
ulated by means of a screw which lies behind it and by
which it may be followed up as fast as the end of the bar
wears away by use and it is further secured in its
place by a perpendicular screw. The set is moved
by an upright bar the upper end of which with its fric-
tion wheel meets the cam of the main axis while the
lower end of it is directed by a mortise in the bed piece
the upper end being kept in place by an arm and
joint. This upright bar passes down between two tog-
gle joints one of which connects it with a support on the
bed piece and the other connects it with the main body
of the set which is thus alternately carried backwards
and forwards against the head of the nail by means of
the toggle joints Witnesses
Benjn B. Hunt
Jno Pickering Jr Briggs R. Reed

[illegible]